US010478835B2

(12) United States Patent
Beatty et al.

(10) Patent No.: US 10,478,835 B2
(45) Date of Patent: Nov. 19, 2019

(54) NOZZLE FOR WET GAS SCRUBBER

(71) Applicant: ExxonMobil Research and Engineering Company, Annandale, NJ (US)

(72) Inventors: Glenn M. Beatty, Houston, TX (US); Christopher J. Fowler, Houston, TX (US); Venkatesh Subramania, Houston, TX (US); Sandipan K. Das, Spring, TX (US); John B. Barnes, Cleveland, TX (US); Laura Johnsen, Spring, TX (US)

(73) Assignee: EXXONMOBIL RESEARCH AND ENGINEERING COMPANY, Annandale, NJ (US)

(*) Notice: Subject to any disclaimer, the term of this patent is extended or adjusted under 35 U.S.C. 154(b) by 0 days.

(21) Appl. No.: 15/793,245

(22) Filed: Oct. 25, 2017

(65) Prior Publication Data

US 2018/0141059 A1     May 24, 2018

Related U.S. Application Data

(60) Provisional application No. 62/425,219, filed on Nov. 22, 2016.

(51) Int. Cl.
    *B05B 1/12*      (2006.01)
    *B05B 1/34*      (2006.01)
    *B05B 7/10*      (2006.01)

(52) U.S. Cl.
CPC ............. *B05B 1/12* (2013.01); *B05B 1/3442* (2013.01); *B05B 1/3457* (2013.01); *B05B 7/10* (2013.01); *B05B 1/3415* (2013.01); *B05B 1/3489* (2013.01)

(58) Field of Classification Search
CPC ....... B05B 1/12; B05B 1/3457; B05B 1/3442; B05B 7/10; B05B 1/3415; B05B 1/3489;
(Continued)

(56) References Cited

U.S. PATENT DOCUMENTS 1,205,563 A * 11/1916 Pepper ...................... B05B 7/10
                                                    239/403
1,380,834 A *   6/1921 Parker .................. B05B 1/3415
                                                      239/11

(Continued)

FOREIGN PATENT DOCUMENTS

| CA | 1 050 589 A | * | 3/1979 | ........... B05B 1/3415 |
| EP | 0 350 250 A1 | * | 1/1990 | ........... B05B 1/3415 |
| GB | 1 152 163 A | * | 5/1969 | ............... B05B 1/02 |

OTHER PUBLICATIONS

Deckers, J. et al., "Additive Manufacturing of Ceramics: A Review", Journal of Ceramic Science and Technology, 2014, vol. 5, Issue 4, pp. 245-260.

*Primary Examiner* — Timothy C Vanoy
(74) *Attorney, Agent, or Firm* — Liza Negron; Andrew T. Ward

(57) ABSTRACT

A nozzle and methods of gas stripping utilizing the nozzle are provided. A nozzle is provided comprising a ceramic nozzle assembly comprising an inlet at one end of a cylindrical portion, an outlet at one end of a conical portion; the cylindrical portion transitioning to the conical portion at an end of the cylindrical portion distal from the inlet; the conical portion transitioning to the cylindrical portion at an end of the conical portion distal from the outlet; and a ceramic vane assembly within the cylindrical portion; the vane assembly comprising a central vane support located substantially concentrically within the cylindrical portion, and a plurality of angled vanes extending from the central vane support to an inner wall of the cylindrical portion;

(Continued)

wherein the ceramic nozzle assembly and the ceramic vane assembly are manufactured such that the two assemblies comprise a single piece of ceramic.

26 Claims, 1 Drawing Sheet

(58) Field of Classification Search
CPC ...... C10G 2300/207; C10G 2300/4043; C10G 2300/405; B01D 47/06
See application file for complete search history.

(56) References Cited

U.S. PATENT DOCUMENTS

| 2,473,674 | A | | 11/1944 | Boehm | |
|---|---|---|---|---|---|
| 2,627,439 | A | * | 2/1953 | Wornall | B05B 1/12 239/539 |
| 3,104,829 | A | * | 9/1963 | Wahlin | B05B 1/3415 239/465 |
| 3,146,674 | A | * | 9/1964 | Wahlin | B05B 1/3415 29/558 |
| 3,275,248 | A | * | 9/1966 | O'Brien | B05B 1/12 239/466 |
| 3,675,854 | A | * | 7/1972 | Livingston | A62C 31/005 169/37 |
| 4,466,741 | A | * | 8/1984 | Kojima | B01F 5/0615 138/37 |
| 4,875,627 | A | * | 10/1989 | Coulston | B05B 1/3415 239/466 |
| 5,232,165 | A | * | 8/1993 | Tournier | B05B 1/12 239/462 |
| 5,851,465 | A | * | 12/1998 | Bredt | B29C 41/003 264/109 |
| 10,052,647 | B2 | * | 8/2018 | Diebel | B05B 15/55 |
| 2003/0052197 | A1 | * | 3/2003 | Bui | B05B 7/0475 239/416.4 |
| 2012/0134776 | A1 | * | 5/2012 | Bou Lawz Ksayer | B05B 1/3415 415/80 |
| 2017/0205070 | A1 | * | 7/2017 | Ryon | F02C 7/222 |

* cited by examiner

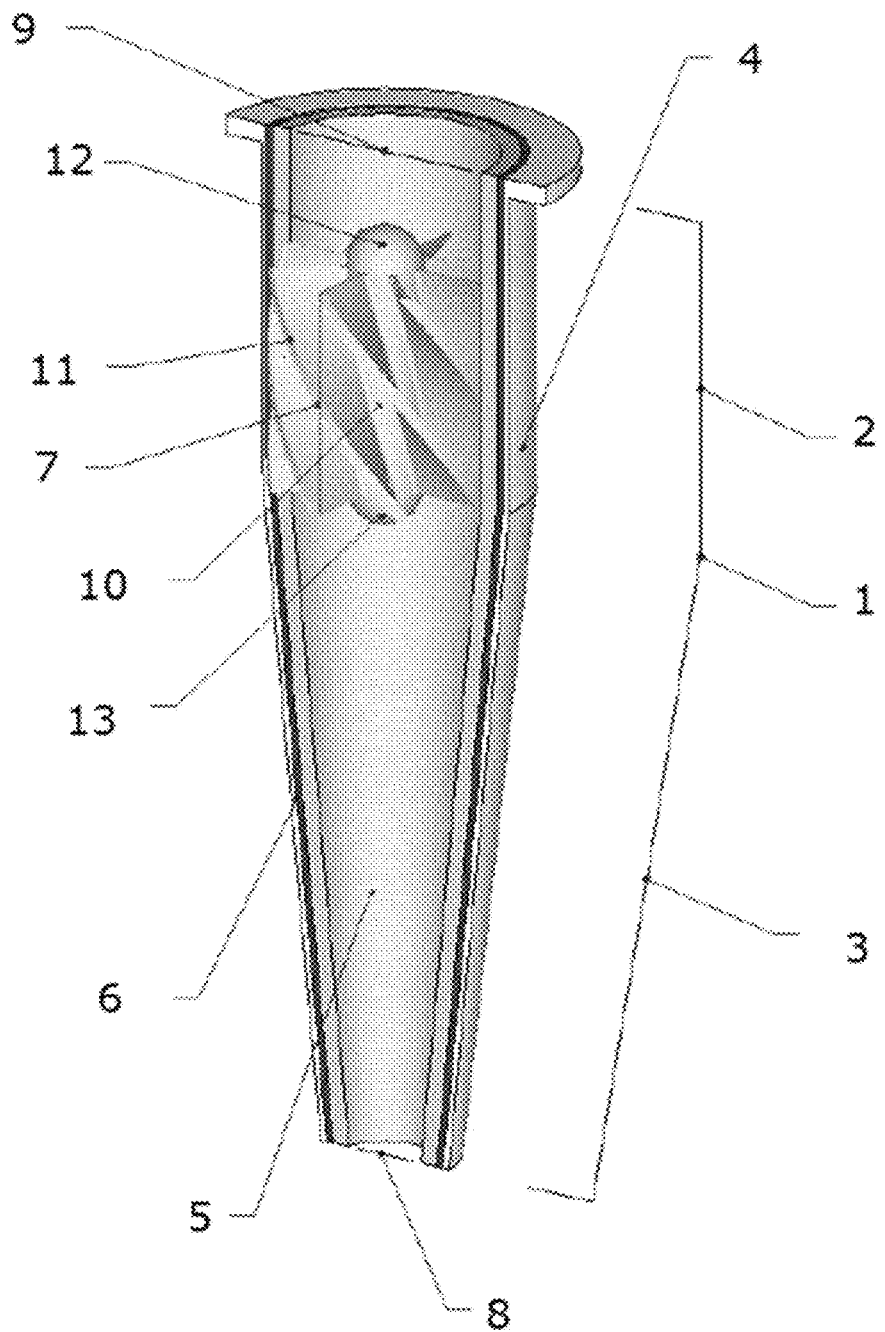

NOZZLE FOR WET GAS SCRUBBER

CROSS-REFERENCE TO RELATED APPLICATIONS

This application claims priority to U.S. Provisional Application Ser. No. 62/425,219 filed Nov. 22, 2016, which is herein incorporated by reference in its entirety.

FIELD

The present disclosure relates to apparatuses and methods related to nozzles for use in jet ejector venturi wet gas scrubbers.

BACKGROUND

Spray nozzles are critical pieces of equipment for jet ejector venturi (JEV) wet gas scrubbers (WGS), which service various refinery components, including high value fluid catalytic cracking (FCC) units. The nozzles are designed to co-currently spray a scrubbing liquid into a chamber containing a hot, turbulent gaseous stream, e.g. FCC flue gas. The gaseous stream may contain certain contaminants including sulfur oxides ($SO_x$), nitrogen oxides ($NO_x$), carbon monoxide (CO), and carbon dioxide ($CO_2$) as well as dispersed particulate matter. These contaminants are must be removed under strict regulatory guidelines.

The nozzles generate a high pressure spray which is well-mixed with the flue gas to minimize the contaminants escaping into the atmosphere and also provide enough vacuum to propel the flue gas through the scrubber. Conventional nozzles used in these applications comprise at least two separate pieces, a nozzle assembly and a vane assembly. The nozzle assembly can be made of hardened stainless steel, but is typically comprised of a steel nozzle lined with ceramic. The vane assembly is generally made of hardened stainless steel and is ground-to-fit within a cylindrical portion of the ceramic-lined nozzle assembly.

Hardened stainless steel is more susceptible to corrosion and erosion than ceramic. As such, vanes of conventional vane assemblies over time will exhibit signs of corrosion and/or erosion and will need to be removed from service. In other instances, the vane assembly can be subjected to over-grinding before installation within the cylindrical portion of the ceramic nozzle assembly. Over-grinding can permit movement between the vanes and the cylindrical portion of the ceramic nozzle assembly, which can lead to the vane assembly spinning when the scrubbing liquid impacts the vanes. This spinning can result in catastrophic failure of the nozzle, which can require shut down of surrounding equipment at significant expense.

Replacing a hardened stainless steel vane assembly with a ceramic vane assembly does not fix the above problems. The issues could be solved by eliminating the joint between the vane and nozzle assembly. Thus, it would be advantageous to produce a nozzle assembly, with incorporated vane assembly, that consisted of a single piece of ceramic.

SUMMARY

A nozzle and methods of gas stripping utilizing the nozzle are provided. In one aspect, a nozzle is provided comprising, a ceramic nozzle assembly comprising an inlet at one end of a cylindrical portion, an outlet at one end of a conical portion; the cylindrical portion transitioning to the conical portion at an end of the cylindrical portion distal from the inlet; the conical portion transitioning to the cylindrical portion at an end of the conical portion distal from the outlet; and a ceramic vane assembly within the cylindrical portion; the vane assembly comprising a central vane support located substantially concentrically within the cylindrical portion, and a plurality of angled vanes extending from the central vane support to an inner wall of the cylindrical portion; wherein the ceramic nozzle assembly and the ceramic vane assembly are manufactured such that the two assemblies comprise a single piece of ceramic.

In another aspect, the central vane support can be rounded at each of its ends to reduce the angle of incidence of fluid flow contacting the central vane support. In another aspect, the plurality of angled vanes can be manufactured such that each edge joining each of the plurality of angled vanes to the central vane support and/or the cylindrical portion has a greater cross-sectional area in a plane axial to a direction of a flow through the nozzle assembly than the same cross-sectional area at a midpoint of each of the plurality of angled vanes. In other aspects, the plurality of angled vanes can be angled such that the angle of incidence of fluid flow through the vane is 10 to 60 degrees, e.g. 20 degrees or 35 degrees. Optionally, the leading edge of the plurality of angled vanes is round beveled.

The geometry of the nozzle can be adjusted to produce the desired spray pattern. In one aspect, the cylindrical portion of the nozzle has an axial dimension of $L_1$ and the conical portion has an axial dimension of $L_2$, wherein the ratio of $L_1:L_2$ is 1 to 3, e.g. 1 or 2. In another aspect, wherein the inlet has a diameter of $D_1$ and the outlet as a diameter of $D_2$, wherein the ratio of $D_1:D_2$ is 2 to 3, e.g. 2.67.

In one embodiment of the nozzle described herein the single piece of ceramic comprises nitride bonded silicon carbide and can be manufactured by 3D-printing or co-sintering.

Also provided herein is a method for removal of a contaminant gas from a gaseous stream. In one aspect, the method comprises, providing a gaseous stream containing a contaminant; directing the gaseous stream through a wet gas scrubber; wherein the wet gas scrubber includes the nozzle described in the paragraphs above; admitting a scrubbing liquid through the nozzle into the wet gas scrubber; and mixing the gaseous stream with the scrubbing liquid such that the contaminant is adsorbed or stripped away in liquid droplets from the gaseous stream. The gaseous stream can be a flue gas from a refinery component, such as a fluid catalytic cracker. The contaminant can be particulate matter entrained within the gaseous stream and/or nitrogen oxides ($NO_x$), sulfur oxides ($SO_x$), carbon monoxide, and carbon dioxide.

BRIEF DESCRIPTION OF THE DRAWINGS

FIG. 1 is an exemplary nozzle of the present disclosure.

DETAILED DESCRIPTION

In various aspects ceramic nozzles and methods for using the same are provided. While the nozzles described herein are described with reference to refinery processes, it should be appreciated that the nozzles are not so limited and could be used in any application where such a nozzle would be useful.

Refinery processes, especially wet gas scrubbing processes, require the reliable use of nozzles, among other things. Wet gas scrubbers use a liquid to remove solid, liquid, or gaseous contaminants from a gaseous stream. The scrubbing liquid performs this separation by dissolving, trapping, or chemically reacting with the contaminant. Scrubbers are used extensively to control air polluting emissions. Scrubber systems can be designed to remove entrained particulate materials such as dust, fly ash, or metal oxides, or to remove gases, such as oxides of sulfur (SOx), from a flue gas stream to meet air emission standards. The scrubbing liquid is introduced to the wet gas scrubber through a nozzle.

The nozzle functions to disperse the scrubbing liquid into the gaseous stream. The greater liquid-gas contact, the more effective the scrubber will be at removing contaminants. As discussed above, state of the art nozzles are currently prone to failure for various reasons. The vane assembly is generally made of hardened stainless steel which is susceptible to the corrosive environments in which the nozzles operate. Improper installation of the vane assembly, e.g. overgrinding of the steel vanes, can allow movement between the vanes and the cylindrical portion of the ceramic nozzle assembly, which can lead to catastrophic failure of the nozzles.

Nozzle Structure

FIG. 1 depicts an exemplary nozzle that solves the issues encountered in the prior art. The design geometry allows for the nozzle assembly 1 to be constructed out of a single, monolithic piece of ceramic. The nozzle assembly 1 is intended to be more durable than current nozzles and will be exposed to high flow rates of recirculating industrial water containing suspended abrasive particles and continuously buffered with caustic to maintain a nominal pH of about 7.2 for the entire service lifetime. The pH can range from 6-10 for short periods of time. All internal nozzle surfaces are exposed to corrosive and erosive flows, so construction with a ceramic is preferable to usage of other materials such as steel. By constructing the vane assembly 7 and surrounding ceramic liner 5, which is comprised of a cylindrical portion 2 and a conical portion 3, out of a single ceramic piece, the downward force applied to the vane assembly 7 by the flowing liquid is transmitted along the entire length of each angled vane 11. This is in contrast to conventional nozzles of this type, where the downward force is concentrated at the bottommost portion of each vane 11. This design additionally eliminates the possibility that the vanes 11 will be over ground when the vane assembly 7 is fit to the ceramic liner 5. Angled vanes 11 can be oriented such that the angle of incidence of a fluid flow through an angled vane 11 can be 10°-60°, e.g. 20°-35°, 20°, or 35°.

The aerodynamic design additionally includes a round knuckle (bluff body) 12 on the leading edge of the central vane support and a lagging knuckle (bluff body) 13 downstream of the support to better distribute flow into the vanes 11 and reduce drag as scrubbing fluid exits the vane assembly 7. This design also reduces the force observed at the upstream face of the central vane support 10, thereby reducing the transmitted load the vane-liner interface. The knuckles improve the overall strength of the design. In addition the leading edges of each vane 11 can be round-beveled, serving a similar purpose to the leading knuckle 12. These modifications reduce the incidence angle of these faces, which dramatically helps reduce erosion performance of the ceramic parts.

The connections between each vane blade 11 and the surrounding interfaces at liner 5 and central vane support 10 can be manufactured such that the cross-sectional area of the vane blade 11 at the central vane support 10 interface or the ceramic liner 5 interface in the plane axial to the direction of scrubbing fluid flow is greater than a similar cross sectional area at a midpoint of the vane blade. This increases the surface area between the vanes and cylinder(s) and therefore increases the overall strength of the nozzle.

As indicated above, ceramic liner 5 comprises a cylindrical portion 2 and a conical portion 3. Changing the geometry of these two sections as well as angled vanes 11 can affect the spray pattern of the nozzle. In general, a higher vane angle and a shorter conical length can caused a more dispersed spray pattern, which is advantageous in scrubber applications where liquid-gas contact is imperative. In certain embodiments, the cylindrical portion has an axial dimension of $L_1$ and the conical portion has an axial dimension of $L_2$, wherein the ratio of $L_1:L_2$ is 1 to 3, e.g. 1 or 2.

Beveled vanes 11 as well the curved leading knuckle 12 and curved lagging knuckle 13 results in all surfaces facing scrubbing liquid flow have incidences angles less than or equal to 60. The nozzle can be incorporated into existing refinery systems via steel shell 4, which is attached to ceramic liner 5 via mortar 6 using established press-fit, tile-setting procedures.

Nozzle Operation in Scrubbing Processes

In operation, scrubbing liquid is pumped at high flow rate and pressure through the nozzle assembly 1. As the liquid enters the cylindrical portion 2 of the nozzle assembly 1 through the inlet 9 and passes through the vane assembly 7, the leading curved knuckle 12 breaks up the flow and directs it through the channels formed between the angled vanes 11 and the nozzle liner 5. The liquid accelerates as it is forced around the central vane support 10 into a smaller cross sectional area. As the liquid impacts the angled vanes 11, the vanes impart angular momentum to the liquid. This swirling liquid then exits the vane assembly 7 and reaches the converging conical portion 3, where it is further accelerated. As the fluid exits the nozzle orifice 8, it has a higher velocity overall, and that velocity also has an angular component by virtue of vane assembly 7. This causes the liquid spray to spread outward in sheets as it exits the nozzle 1, creating a cone-shaped spray, which is beneficial for liquid-gas mixing.

Friction at the boundary of the nozzle orifice 8 creates a slower moving boundary layer, resulting in higher momentum flux through the interior and therefore a full-cone spray. The resulting sheets of liquid are particularly unstable since they are moving at such high velocities relative to the surrounding media (flue gas). This instability causes further break-up into droplets at increasing distances from the nozzle orifice 8.

Manufacturing Processes

The nozzle of the present invention is made from ceramic, preferably nitride bonded silicon carbide (NBSC), but other abrasion resistant Oxide, Nitride, Boride, Carbide ceramics or Ceramic metal composites may also be acceptable. NBSC is preferred because the material exhibits very small dimensional changes during thermal processing. The negative dimensional change is almost entirely offset by the dimensional growth of silicon nitride bonding phase which occurs during thermal processing. This enables the manufactured of large complex parts at relatively low cost. NBSC exhibits a hardness more than five times that of hardened 410 stainless steel, the material that typical vane assemblies are made of A person of skill in the art would understand that hardness is known to correlate to wear resistance, particularly at low incidence angles like those described herein.

The nozzles can be manufactured as a single ceramic piece through various ceramic manufacturing techniques, e.g. 3-D printing or co-sintering. The ISO/ASTM 17296 standard on Additive Manufacturing (AM) Technologies defines AM as the "process of joining materials to make objects from three-dimensional (3D) model data, usually layer by layer, as opposed to subtractive manufacturing and formative manufacturing methodologies." According to the standard, seven types of AM processes can be differentiated: material jetting, material extrusion, direct energy deposition, sheet lamination, binder jetting, powder bed fusion and vat photopolymerization. These seven AM technologies can all be applied to shape ceramic components, starting from usually submicrometer-sized ceramic powder particles There are basically two different categories of AM process according to the ISO/ASTM standard: (i) the single step processes (also called 'direct' processes), in which parts are fabricated in a single operation where the basic geometrical shape and basic material properties of the intended product are achieved simultaneously and (ii) the multi-step processes (also called 'indirect' processes), in which the parts are fabricated in two or more operations where the first typically provides the basic geometric shape and the following consolidates the part to the intended basic material properties. Most of the AM processes to shape ceramics are multi-step (indirect) processes, which make use of a sacrificial binder material to shape ceramic powder particles. This binder is usually removed in a subsequent 'debinding' furnace treatment.

3D printing is an example of a single step process. Each of these processes is discussed in more detail in Deckers, J. et al., *Additive Manufacturing of Ceramics: A Review*, 5 J. OF CERAMIC SCI. AND TECH. 245 (2014), which is incorporated herein by reference.

The ceramic process of co-sintering allows for manufacturing via more traditional ceramic processing techniques and relies on the creation of ceramic bonds during the firing process. Sub assemblies (Cylinder section, conical section and vane assembly) are manufactured separately, assembled and bonded together during thermal processing (sintering). This creates a single homogenous ceramic body.

ADDITIONAL EMBODIMENTS

Embodiment 1

A nozzle comprising, a ceramic nozzle assembly comprising an inlet at one end of a cylindrical portion, an outlet at one end of a conical portion; the cylindrical portion transitioning to the conical portion at an end of the cylindrical portion distal from the inlet; the conical portion transitioning to the cylindrical portion at an end of the conical portion distal from the outlet; and a ceramic vane assembly within the cylindrical portion; the vane assembly comprising a central vane support located substantially concentrically within the cylindrical portion, and a plurality of angled vanes extending from the central vane support to an inner wall of the cylindrical portion; wherein the ceramic nozzle assembly and the ceramic vane assembly are manufactured such that the two assemblies comprise a single piece of ceramic.

Embodiment 2

The nozzle of embodiment 1, wherein the central vane support is rounded at ends proximate to the inlet and the outlet and perpendicular to a fluid flow through the nozzle.

Embodiment 3

The nozzle of any of the previous embodiments, wherein the plurality of angled vanes extending from the central vane support to the inner wall of the cylindrical portion are manufactured such that each edge joining each of the plurality of angled vanes to the central vane support has a greater cross-sectional area in a plane axial to a direction of a flow through the nozzle assembly than the same cross-sectional area at a midpoint of each of the plurality of angled vanes.

Embodiment 4

The nozzle of any of the previous embodiments, wherein the plurality of angled vanes extending from the central vane support to the inner wall of the cylindrical portion are manufactured such that each edge joining each of the plurality of angled vanes to the cylindrical portion has a greater cross-sectional area in a plane axial to a direction of a flow through the nozzle assembly than the same cross-sectional area at a midpoint of each of the plurality of angled vanes.

Embodiment 5

The nozzle of any of the previous embodiments, wherein the plurality of angled vanes are angled such that an angle of incidence from a flow through the vane assembly is 10 to 60 degrees.

Embodiment 6

The nozzle of embodiment 5, wherein the angle of incidence is 20 to 35 degrees.

Embodiment 7

The nozzle of any of the previous embodiments, wherein the cylindrical portion has an axial dimension of $L_1$ and the conical portion has an axial dimension of $L_2$, wherein the ratio of $L_1:L_2$ is 1 to 3, e.g. 1 or 2.

Embodiment 8

The nozzle of any of the previous embodiments, wherein the inlet has a diameter of $D_1$ and the outlet as a diameter of $D_2$, wherein the ratio of $D_1:D_2$ is 2 to 3, e.g. 2.67.

Embodiment 9

The nozzle of any of the previous embodiments, wherein the single piece of ceramic comprises nitride bonded silicon carbide.

Embodiment 10

The nozzle of any of the previous embodiments, wherein the nozzle is manufactured by one of 3D-printing and co-sintering.

Embodiment 11

The nozzle of any of the previous embodiments, wherein the plurality of angle vanes have a leading edge that is round beveled.

Embodiment 12

A method for removal of a contaminant gas from a gaseous stream comprising, providing a gaseous stream containing a contaminant; directing the gaseous stream through a wet gas scrubber; wherein the wet gas scrubber includes the nozzle of any of the previous embodiments; admitting a scrubbing liquid through the nozzle of any of the previous embodiments into the wet gas scrubber; and mixing the gaseous stream with the scrubbing liquid such that the contaminant is adsorbed or stripped away in liquid droplets from the gaseous stream.

Embodiment 13

The method of embodiment 12, wherein the gaseous stream is a flue gas from a refinery component, such as a fluid catalytic cracker.

Embodiment 14

The method of embodiment 12 or 13, wherein the contaminant is particulate matter entrained in the flue gas.

Embodiment 15

The method of one of embodiments 12-14, wherein the contaminant is one of NOx, SOx, CO, and $CO_2$.

The invention claimed is:

1. A nozzle comprising,
a ceramic nozzle assembly comprising an inlet at one end of a cylindrical portion, an outlet at one end of a conical portion, wherein the cylindrical portion transitioning to the conical portion at an end of the cylindrical portion distal from the inlet, wherein the conical portion transitioning to the cylindrical portion at an end of the conical portion distal from the outlet; and
a ceramic vane assembly within the cylindrical portion, wherein the vane assembly comprising a central vane support located substantially concentrically within the cylindrical portion, and a plurality of angled vanes extending from the central vane support to an inner wall of the cylindrical portion,
wherein the ceramic nozzle assembly and the ceramic vane assembly are manufactured such that the two assemblies comprise a single piece of ceramic,
wherein the central vane support is rounded at ends proximate to the inlet and the outlet and perpendicular to a fluid flow through the nozzle;
wherein the cylindrical portion has an axial dimension of L1 and the conical portion has an axial dimension of L2, wherein the ratio of L1:L2 is 1 to 3.

2. The nozzle of claim 1, wherein the plurality of angled vanes extending from the central vane support to the inner wall of the cylindrical portion are manufactured such that each edge joining each of the plurality of angled vanes to the central vane support has a greater cross-sectional area in a plane axial to a direction of a flow through the nozzle assembly than the same cross-sectional area at a midpoint of each of the plurality of angled vanes.

3. The nozzle of claim 2, wherein the plurality of angled vanes extending from the central vane support to the inner wall of the cylindrical portion are manufactured such that each edge joining each of the plurality of angled vanes to the cylindrical portion has a greater cross-sectional area in a plane axial to a direction of a flow through the nozzle assembly than the same cross-sectional area at a midpoint of each of the plurality of angled vanes.

4. The nozzle of claim 1, wherein the plurality of angled vanes are angled such that an angle of incidence from a flow through the vane assembly is 10 to 60 degrees.

5. The nozzle of claim 4, wherein the angle of incidence is 20 to 35 degrees.

6. The nozzle of claim 1, wherein the ratio of L1:L2 is 1.

7. The nozzle of claim 6, wherein the ratio of L1:L2 is 2.

8. The nozzle of claim 1, wherein the inlet has a diameter of D1 and the outlet as a diameter of D2, wherein the ratio of D1:D2 is 2 to 3.

9. The nozzle of claim 8, wherein the ratio of D1:D2 is about 2.67.

10. The nozzle of claim 1, wherein the single piece of ceramic comprises nitride bonded silicon carbide.

11. A nozzle comprising,
a ceramic nozzle assembly comprising an inlet at one end of a cylindrical portion, an outlet at one end of a conical portion, wherein the cylindrical portion transitioning to the conical portion at an end of the cylindrical portion distal from the inlet, wherein the conical portion transitioning to the cylindrical portion at an end of the conical portion distal from the outlet; and
a ceramic vane assembly within the cylindrical portion, wherein the vane assembly comprising a central vane support located substantially concentrically within the cylindrical portion, and a plurality of angled vanes extending from the central vane support to an inner wall of the cylindrical portion,
wherein the ceramic nozzle assembly and the ceramic vane assembly are manufactured such that the two assemblies comprise a single piece of ceramic, wherein the nozzle is manufactured by one of 3D-printing and co-sintering;
wherein the cylindrical portion has an axial dimension of L1 and the conical portion has an axial dimension of L2, wherein the ratio of L1:L2 is 1 to 3.

12. The nozzle of claim 11, wherein the plurality of angled vanes extending from the central vane support to the inner wall of the cylindrical portion are manufactured such that each edge joining each of the plurality of angled vanes to the central vane support has a greater cross-sectional area in a plane axial to a direction of a flow through the nozzle assembly than the same cross-sectional area at a midpoint of each of the plurality of angled vanes.

13. The nozzle of claim 12, wherein the plurality of angled vanes extending from the central vane support to the inner wall of the cylindrical portion are manufactured such that each edge joining each of the plurality of angled vanes to the cylindrical portion has a greater cross-sectional area in a plane axial to a direction of a flow through the nozzle assembly than the same cross-sectional area at a midpoint of each of the plurality of angled vanes.

14. The nozzle of claim 11, wherein the plurality of angled vanes are angled such that an angle of incidence from a flow through the vane assembly is 10 to 60 degrees.

15. The nozzle of claim 14, wherein the angle of incidence is 20 to 35 degrees.

16. The nozzle of claim 11, wherein the ratio of L1:L2 is 1.

17. The nozzle of claim 16, wherein the ratio of L1:L2 is 2.

18. The nozzle of claim 11, wherein the inlet has a diameter of D1 and the outlet as a diameter of D2, wherein the ratio of D1:D2 is 2 to 3.

19. The nozzle of claim 18, wherein the ratio of D1:D2 is about 2.67.

20. The nozzle of claim 11, wherein the single piece of ceramic comprises nitride bonded silicon carbide.

21. The nozzle of claim 11, wherein the plurality of angle vanes have a leading edge that is round beveled.

22. A method for removal of a contaminant gas from a gaseous stream comprising, provide a gaseous stream containing a contaminant;

directing the gaseous stream through a wet gas scrubber; wherein the wet gas scrubber includes the nozzle of claim 1;

admitting a scrubbing liquid through the nozzle of claim 1 into the wet gas scrubber;

and mixing the gaseous stream with the scrubbing liquid such that the contaminant is adsorbed or stripped away in liquid droplets from the gaseous stream.

23. The method of claim 22, wherein the gaseous stream is a flue gas from a refinery component.

24. The method of claim 23, wherein the refinery component is a fluid catalytic cracker.

25. The method of claim 23, wherein the contaminant is particulate matter entrained in the flue gas.

26. The method of claim 22, wherein the contaminant is one of NOx, SOx, CO, and CO2.

* * * * *